US009049869B2

(12) United States Patent
Yano

(10) Patent No.: US 9,049,869 B2
(45) Date of Patent: Jun. 9, 2015

(54) METHOD FOR IMPROVING BREAD-MAKING PROPERTIES OF RICE FLOUR BREAD DOUGH

(75) Inventor: Hiroyuki Yano, Ibaraki (JP)

(73) Assignee: Incorporated Administrative Agency National Agriculture and Food Research Organization, Ibaraki (JP)

( * ) Notice: Subject to any disclaimer, the term of this patent is extended or adjusted under 35 U.S.C. 154(b) by 143 days.

(21) Appl. No.: 13/496,231

(22) PCT Filed: Sep. 10, 2010

(86) PCT No.: PCT/JP2010/065577
§ 371 (c)(1),
(2), (4) Date: Mar. 15, 2012

(87) PCT Pub. No.: WO2011/033994
PCT Pub. Date: Mar. 24, 2011

(65) Prior Publication Data
US 2012/0177780 A1    Jul. 12, 2012

(30) Foreign Application Priority Data

Sep. 15, 2009 (JP) ................. 2009-213373

(51) Int. Cl.
| A21D 2/00 | (2006.01) |
| A21D 10/00 | (2006.01) |
| A23L 1/28 | (2006.01) |
| A21D 13/04 | (2006.01) |
| A21D 2/24 | (2006.01) |
| A21D 2/28 | (2006.01) |
| A21D 13/06 | (2006.01) |

(52) U.S. Cl.
CPC ............... *A21D 13/04* (2013.01); *A21D 2/245* (2013.01); *A21D 2/28* (2013.01); *A21D 13/066* (2013.01)

(58) Field of Classification Search
CPC ............... A21D 13/04; A21D 10/002; A23V 2200/126; C12N 1/18; C12P 13/12
See application file for complete search history.

(56) References Cited

U.S. PATENT DOCUMENTS

| 4,405,648 | A | * | 9/1983 | Atsumi et al. ................. 426/19 |
| 6,113,951 | A | | 9/2000 | Buchanan et al. |
| 2003/0215542 | A1 | * | 11/2003 | Buchanan et al. ............. 426/1 |
| 2006/0088647 | A1 | * | 4/2006 | Kadan .......................... 426/622 |

FOREIGN PATENT DOCUMENTS

| EP | 0262669 | 4/1988 |
| EP | 1552750 | 7/2005 |
| EP | 1552750 A1 * | 7/2005 |
| JP | 61-23971 | 6/1986 |

(Continued)

OTHER PUBLICATIONS

Third Party Observations filed on Sep. 9, 2011.
(Continued)

*Primary Examiner* — Michele L. Jacobson
*Assistant Examiner* — Subbalakshmi Prakash
(74) *Attorney, Agent, or Firm* — McCarter & English

(57) ABSTRACT

This invention provides a method for improving bread-making properties of bread dough using rice flour as the main material. The invention relates to a dough improving agent for rice flour breads, wherein said agent comprises glutathione and a method for making rice flour breads using the same.

16 Claims, 9 Drawing Sheets

(56) References Cited

FOREIGN PATENT DOCUMENTS

| JP | H02-273137 |   | 7/1990 |
|----|-----------|---|--------|
| JP | 06-000049 |   | 1/1994 |
| JP | 06-000050 |   | 1/1994 |
| JP | 7-502887  |   | 3/1995 |
| JP | 2002045134 A | * | 2/2002 |
| JP | 2004-008007 |   | 1/2004 |
| JP | 2004-208561 |   | 7/2004 |
| JP | 2009-22306 |   | 2/2009 |

OTHER PUBLICATIONS

Joye, Iris J., et al., "Endogenous Redox Agents and Enzymes That Affect Protein Network Formation During Breadmaking—A Review", Journal of Cereal Science, Jul. 2009, vol. 50, No. 1, pp. 1-10.

Kohler, P., et al., "Fraktionierung und Rekombination von Weizenmehl—Einfluss auf Teigrheologie und Backverhalten", Getreide Mehlund Brot, 1999, vol. 53, No. 1, pp. 16-19.

Daihachi IGA, "Seipan ni Okeru Koso No Hataraki (7) Koso-tte Nani . . . ? Koso no Hataraki no Donyubu Sono 7", Pain, 2001, vol. 48, No. 8, pp. 41-45.

Yano, Hiroyuki "Improvements in the Bread-Making Quality of Gluten-Free Rice Batter by Glutathione", Journal of Agricultural and Food Chemistry, Jul. 2010, vol. 58, No. 13, pp. 7949-7954.

Komiya, Takashi, et al., "The Improving Effects of Additives on the Reheology of Wheat Flour Dough: Improving Actions of Ascorbic Acid and Glutathion", The Bulletin of the Faculty of Bioresources, Mie University, 1997, No. 19, pp. 21-27.

"Atarashii Seipan Kiso Chishiki (kaiteiban)", New Basic Baking Guide (Revised Edition), Pan News, Co., Ltd., Jun. 6, 2002, pp. 1-4.

* cited by examiner

Amount of GSH added relative to 280 g of rice flour (g)

Amount of GSSG or GSH added
relative to 140 g of rice flour (g)

Amount of salt added relative to 140 g of rice flour (g)

A

<After allowing to stand overnight, mixing, fermentation, and baking>

0 g of glutathione    0.1 g of glutathione 0.2 g of glutathione    0.5 g of glutathione

B

<After allowing to stand for two nights, mixing, fermentation, and baking>

0 g of glutathione    0.1 g of glutathione 0.2 g of glutathione    0.5 g of glutathione

METHOD FOR IMPROVING BREAD-MAKING PROPERTIES OF RICE FLOUR BREAD DOUGH

RELATED APPLICATIONS

This application is a national stage application filed under 35 USC §371 of PCT/JP2010/065577, filed Sep. 10, 2010, which claims the benefit of Japanese Patent Application No. 2009-213373, filed Sep. 15, 2009, both of which are incorporated herein, in entirety, by reference.

TECHNICAL FIELD

The present invention relates to a technique for improving bread-making properties of bread dough using rice flour as the main material.

BACKGROUND OF THE INVENTION

In recent years, the development of rice flour breads has been encouraged, so as to increase rice flour consumption. Since gluten contained in wheat flour breads (wheat gluten) is known to cause wheat allergies, rice flour breads made with the use of rice flour as a substitute for wheat flour have drawn attention as foods for patients with the allergies.

Wheat gluten is an important ingredient in producing fluffy, puffed-up breads. In the case of general wheat flour bread making, it is known that water and carbohydrates, such as sugar are added to and kneaded with wheat flour to generate "gluten," which is rich in viscosity and elasticity, from wheat flour proteins gliadin and glutenin. It is also known that gluten enhances the expansibility and elasticity of bread dough, and thereby wheat flour breads exhibit satisfactory fluffiness and softness after fermentation and baking.

However, in a bread dough comprising rice flour as a sole main ingredient, gluten is not generated after mixing (kneading) the dough. Accordingly, rice flour breads would not be able to rise satisfactorily when the same method of bread making is used as that used for wheat flour breads, meaning that so-called "bread" cannot be made. Thus, most commercially available rice flour breads or commercially available rice flour for making rice flour bread also comprise wheat flour or wheat gluten. Since such products comprise wheat gluten, patients with wheat allergies cannot ingest the same.

There has also been progress in the development of techniques for making gluten-free rice flour breads. Examples of such techniques include: a method of bread making involving the application of a plastic foam molding technique (JP Patent Publication (Kokai) No. 2003-189786 A); methods involving the use of dough comprising gelatinized ("alpha") rice flour or starch (e.g., JP Patent Publication (Kokai) No. 2006-174822 A and JP Patent Publication (Kokai) No. 2007-215401 A); a method involving the addition of a polysaccharide thickener (JP Patent Publication (Kokai) No. 2005-245409 A); and a method of bread making involving the use of powderization and mixing techniques (JP Patent Publication (Kokai) No. 2006-006200 A). Rice flour breads made by such techniques, however, are significantly inferior to wheat flour breads and rice flour breads made with the addition of gluten in terms of quality, such as fluffiness, softness, or other properties.

In recent years, glutathione, which is deeply associated with oxidoreduction in vivo, has drawn attention as an ingredient allowing recovery of liver functions, detoxication, prevention of cellular senescence, and the like, and it is becoming popular as an ingredient of functional food products such as supplements. Glutathione are contained in, for example, beef liver, spinach, broccoli, and yeast in high amounts. It is known that when reduced glutathione is added to wheat flour breads it acts on wheat gluten and improves wheat flour bread quality ("The Improving Effects of Additives on the Rheology of Wheat Flour Dough: Improving Actions of Ascorbic acid and Glutathion, " The Bulletin of the Faculty of Bioresources, Mie University, No. 19, pp. 21 to 27 (1997)). However, the effects of glutathione as a food additive ingredient have not yet been thoroughly studied.

SUMMARY OF THE INVENTION

Problem to be Solved by Invention

It is an object of the present invention to provide a method for improving bread-making properties of bread dough using rice flour as the main material.

Means for Solving Problem

The present inventors have conducted concentrated studies in order to solve the above problem. As a result, they discovered that rice flour breads of good quality could be made by adding glutathione to bread dough using rice flour as the main material and fermenting such bread dough and baking. That is, they discovered that bread-making properties of rice flour bread dough could be remarkably improved by the method. This has led to the completion of the present invention.

Specifically, the present invention includes the following.

[1] A dough improving agent for rice flour breads, wherein said agent comprises glutathione.

Glutathione contained in such agent may be derived from a yeast extract.

[2] A bread dough obtained by mixing raw materials comprising the dough improving agent according to [1], rice flour, yeast, and water.

It is preferred that such bread dough be free from wheat flour and gluten. In addition, it is preferred that the salt content in such bread dough be 0.4% by mass or less of the rice flour content.

[3] A method for making a rice flour bread comprising fermenting the bread dough according to [2] and baking.

[4] A rice flour bread made by the method according to [3].

[5] A flour mix for making rice flour bread dough, wherein said mix comprises the dough improving agent according to [1] and rice flour.

It is preferred that such mix be free from wheat flour and gluten. In addition, it is preferred that the salt content in such mix be 0.4% by mass or less of the rice flour content.

This description includes the disclosure in the description of Japanese Patent Application No. 2009-213373, to which the present application claims a priority.

Effects of Invention

With the use of the dough improving agent and the method for making rice flour breads using the same, according to the present invention, bread-making properties of bread dough containing rice flour as cereal flour being a main ingredient of breads can be remarkably improved without the addition of gluten.

BRIEF DESCRIPTION OF DRAWINGS

FIG. 2A shows dough at the time of fermentation and FIG. 2B shows bread after baking when glutathione has not been added. FIG. 2C shows dough at the time of fermentation and FIG. 2D shows bread after baking when glutathione has been added.

FIG. 6A is a photograph showing cross sections of rice flour breads. The GSSG:GSH ratios of the breads are 100:0, 83:17, 50:50, 17:83, and 0:100(%) in order from the upper left to the upper right, the lower left, and the lower right of the photograph. FIG. 6B is an enlarged photograph showing foams at a cross section of rice flour bread with GSSG and GSH at a ratio of 100:0(%). FIG. 6C is an enlarged photograph showing foams at a cross section of rice flour bread with GSSG and GSH at a ratio of 0:100(%).

FIG. 9A is a cross-sectional photograph of bread made by adding water and glutathione to rice flour, agitating the mixture, allowing the resultant to stand overnight, and mixing the resultant, followed by fermentation and baking. FIG. 9B is a cross-sectional photograph of bread made by adding water and glutathione to rice flour, agitating the mixture, allowing the resultant to stand for two nights, and mixing the resultant, followed by fermentation and baking. FIG. 9A and FIG. 9B shows breads to which glutathione has been added in amounts of 0 g (without addition), 0.1 g, 0.5 g, and 0.2 g in order in a clockwise direction from upper left.

DETAILED DESCRIPTION OF THE INVENTION

Figure 1:
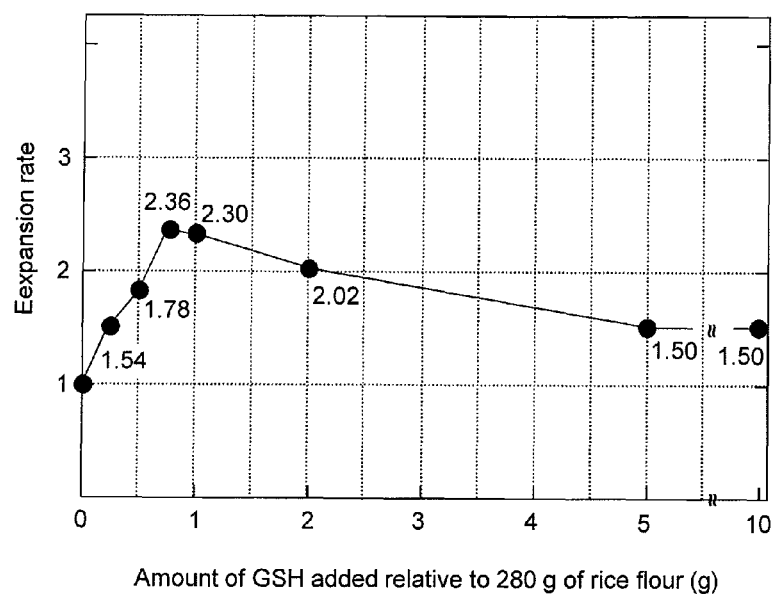
FIG. 1 shows expansion rates of rice flour breads to which different amounts of reduced glutathione (GSH) have been added.

Hereafter, the present invention is described in detail.

The present invention provides a dough improving agent for rice flour breads, wherein the agent comprises glutathione and a method for making rice flour breads of good quality using the dough improving agent.

According to the present invention, glutathione is used as an active ingredient of a dough improving agent for rice flour breads, so that the expandability and flexibility of breads using rice flour as the main material can be improved. In the present invention, glutathione or a composition comprising glutathione can be used as a dough improving agent for rice flour breads. The dough improving agent of the present invention may comprise other ingredients, such as an excipient, preservative, or yeast culture component. The form of the dough improving agent of the present invention is not particularly limited. It may be any form, such as powder, granule, solid, liquid, paste, emulsion, or microencapsulation. The dough improving agent of the present invention may be a food composition comprising glutathione and at least one food additive, such as a food excipient, food preservative, or yeast culture component. In particular, it may be a food composition useful for making rice flour breads. It is preferred that the composition according to the present invention comprise no salt (sodium chloride) (0 g). Alternatively, it is preferred that the amount of salt (sodium chloride) added be 0.4% by mass or less relative to the amount of rice flour used for making rice flour breads (i.e., 0.4 g or less per 100 g of rice flour). It is preferably 0.35% or less, more preferably 0.25% or less, further preferably 0.15% or less, and particularly preferably 0.1% or less by mass.

Glutathione contained in the dough improving agent for rice flour breads according to the present invention may be reduced glutathione, oxidized glutathione, or a mixture thereof. Reduced glutathione (GSH) is tripeptide (γ-L-glutamyl-L-cysteinylglycine) having the chemical formula, $C_{10}H_{17}N_3SO_6$. Oxidized glutathione (GSSG) results from a disulfide bond between the cysteine residues of two molecules of reduced glutathione. Glutathione can be prepared via various known techniques. Examples of known techniques for preparing reduced glutathione include: a method of extraction from yeast at high concentrations (e.g., JP Patent Publication (Kokai) No. H05-252894 A (1993)); reduction of oxidized glutathione (e.g., JP Patent Publication (Kokai) No. 2007-277109 A; JP Patent Publication (Kokai) No. 2007-254325 A; JP Patent Publication (Kokai) No. 2007-254324 A, by Kohjin Co., Ltd.); methods involving the use of yeast variants (JP Patent Publication (Kokai) No. 2006-42637 A; JP Patent Publication (Kokai) No. 2006-42638 A; JP Patent Publication (Kokai) No. H06-70752 A (1994), by Asahi Breweries, Ltd.); and methods of extraction from cultured marine microalgae (JP Patent Publication (Kokai) No. 1109-292 A (1997), by Kawasaki Steel Corporation). Examples of known techniques for preparing oxidized glutathione include a method involving conversion of reduced glutathione into oxidized glutathione (e.g., JP Patent Publication (Kokai) No. H07-177896 A (1995)) and a method involving the use of yeast containing large quantities of oxidized glutathione (e.g., JP Patent Publication (Kokai) No. 2003-284547 A; JP Patent Publication (Kokai) No. 2004-283125 A). Glutathione derived from organisms containing large quantities of glutathione, such as yeast extract, may be used. A commercially available glutathione may also be used.

A yeast extract containing glutathione or a composition containing the same may be used as the dough improving agent for rice flour breads, which comprises glutathione according to the present invention. Examples of yeasts to be used for preparing the dough improving agent of the present invention include: yeasts belonging to the genus *Saccharomyces*, such as *Saccharomyces cerevisiae*, *Saccharomyces pastrianus*, *Saccharomyces bayanus*, *Saccharomyces carlsbergensis*, *Saccharomyces delbrueckii*, *Saccharomyces dairensis*, *Saccharomyces diataticus*, *Saccharomyces exiguus*, *Saccharomyces kluyveri*, *Saccharomyces unisporus* or *Saccharomyces uvarum*, *Saccharomyces rosei*, and *Saccharomyces rouxii*; yeasts belonging to the genus *Schizosaccharomyces*, such as *Schizosaccharomyces pombe*; yeasts belonging to the genus *Candida*, such as *Candida utilis*, *Candida tropicalis*, *Candida milleri*, *Candida krusei*, and *Candida lusitaniae*; yeasts belonging to the genus *Torulaspora*, such as *Torulaspora delbrueckii*; yeasts belonging to the genus *Torulopsis*, such as *Torulopsis celluculosa* and *Torulopsis candida*; yeasts belonging to the genus *Kluyveromyces*, such as *Kluyveromyces thermotolerans*, *Kluyveromyces lactic*, *Kluyveromyces marxianus*, and *Kluyveromyces fragilis*;

yeasts belonging to the genus *Pichia*, such as *Pichia membranaefaciens, Pichia stipitis, Pichia anomala*, and *Pichia saitoi*; yeasts belonging to the genus *Hansenula*, such as *Hansenula anomala*; yeasts belonging to the genus *Debariomyces*, such as *Debariomyces hansenii*; and yeasts belonging to the genus *Zygosaccharomyces*, such as *Zygosaccharomyces rouxii*. These yeast strains can be used alone or in combination. The glutathione-generating yeast containing glutathione or a dried product thereof may be used as yeast for bread making containing a dough improving agent (live or dry yeast). With the use of such yeast for bread making containing a dough improving agent, the dough improving agent according to the present invention and yeast for bread making can be added to bread dough together.

A mixture of reduced glutathione and oxidized glutathione may be used as glutathione used for the dough improving agent for rice flour breads according to the present invention, so that the expandability and flexibility of breads using rice flour as the main material can be modified to desired levels. The mixing ratio of reduced glutathione to oxidized glutathione may be adequately modulated within the reduced glutathione/oxidized glutathione ratio (%) between 0:100 and 100:0. Bread texture can be made softer as the proportion of reduced glutathione increases. In the case of breads such as loaf bread for which a soft texture is preferred, for example, the reduced glutathione content can be 55% or more and preferably 75% or more of the total amount of glutathione added, which allows the realization of a fine, softer texture. In contrast, in the case of breads such as French bread, for which a certain level of chewiness is preferred, the oxidized glutathione content can be 55% or more and preferably 75% or more of the total amount of glutathione added, which allows the realization of a rougher, chewy texture.

In the present invention, the term "rice flour breads" refers to bread made from dough using rice flour as a cereal flour being the main material. In the present invention, the term "breads" refers to a food product prepared by fermenting a dough prepared from raw materials comprising cereal flour as the main material (the "cereal flour" refers to ground cereal seeds in the present invention), water, and yeast, and optionally sub materials (e.g., saccharides such as sugar; oil and fats; other food materials such as dairy products, eggs, vegetables, and fruits; preservatives and food coloring agents), and if desired shaping the dough, or wrapping of other food materials with the dough or adding a topping of other food materials on the dough, and then baking. The term "breads" as referred to herein may be a loaf bread, sweet bun, deli bread, or another type of bread. It may be another food product made by a process involving baking a bread dough, in general. The term "breads" used in context of the present invention includes, but not limited to, loaf bread (long tin), Italian bread, French bread, roll, Danish, croissant, focaccia, piroshki, sourdough bread, baguette, boule, batard, epi bread, coupe bread, pain de mie, pain de campagne, rustique, pain au levain, walnut bread, brioche, pain aux raisin, savarin, kouign amann, brezel, horn, stollen, breadstick, panettone, cinnamon roll, corn bread, pineapple bun, hot dog bun, pizza, naan, waffle, bagel, hardtack, coronet bread (sweet pastry bread shaped like a horn), and pita bread.

The present invention also provides a bread dough comprising the dough improving agent according to the present invention and rice flour as described above. According to the present invention, a dough improving agent for rice flour breads containing glutathione may be added to a rice flour bread dough, so that bread-making properties of rice flour bread dough can be improved.

In the present invention, the term "rice flour bread dough" refers to a dough for making rice flour breads before baking. Bread dough is also referred to as "dough," in general. In the present invention, powder prepared by grinding uncooked nonglutinous rice (uruchi rice) or glutinous rice (mochi rice) can be used as "rice flour". Uncooked rice for using as a raw material for rice flour is not particularly limited, and rice of any variety or lineage, an improved variety thereof, or a mutant variety thereof can be used as the uncooked rice. Commercially available rice flour is classified as, for example, joshinko (pure-white rice powder made from nonglutinous rice), brown rice flour, shiratamako (glutinous rice flour), and the like, categorized depending on the raw materials and techniques used for processing thereof. In the present invention, rice flour milled by various grinding techniques, such as roll grinding, stamp mill grinding, airflow grinding, impact grinding, or shear grinding, can be used as a raw material. Use of rice flour to which gluten is not added is preferred. In the present invention, rice flour does not have to be gelatinized, and use of non-gelatinized rice flour is preferred in order to simplify the process of bread making.

The "rice flour bread dough" of the present invention can be prepared from raw materials at least comprising a dough improving agent for rice flour breads containing glutathione, rice flour, water, and yeast. Preferably, the "rice flour bread dough" of the present invention can be obtained by mixing raw materials for bread, comprising the dough improving agent of the present invention, rice flour, yeast, water, and, if desired, sub materials.

In the rice flour bread dough of the present invention, the ratio for mixing rice flour to water may be determined in accordance with a general amount that is employed when making breads using rice flour, but typically, the amount of water added can be 70% to 120%, and preferably 75% to 115%, of the amount of rice flour added by mass.

The amount of a dough improving agent for rice flour breads added in the rice flour bread dough of the present invention may be determined based on the concentration of glutathione contained therein. Specifically, the dough improving agent of the present invention may be added in such a manner that the amount of glutathione added to the rice flour bread dough of the present invention is 0.05% by mass or more, for example 0.05% to 5.0% by mass, more preferably 0.1% to 2.0% by mass, and further preferably 0.2% to 1.0% by mass relative to the amount of rice flour added.

Any yeast that is used for bread making (e.g., yeast exemplified above as those used for preparation of a dough improving agent) can be used as yeast that is incorporated into the rice flour bread dough of the present invention. A typical example of the yeast is *Saccharomyces cerevisiae*. A person skilled in the art can adequately determine the amount of yeast to be added. In general, yeast may be added in an amount of 0.5% to 5% of the total amount of raw materials for the dough by mass in terms of dry weight.

The rice flour bread dough of the present invention may further comprise other raw materials for breads. Examples of other raw materials include, but are not limited to, sub materials used for bread making, such as saccharides (sugar, glucose, fructose (e.g., honey), maltose, trehalose, and the like), oil and fats (shortening, lard, margarine, butter, and the like), dairy products (milk, fat-free dry milk, dry whole milk, condensed milk, and the like), egg, other food materials contained in breads (nuts, raisins, fruit, vegetable, pulses such as corn, fish and meat, cream, sweet bean paste, cheese, mayonnaise, and the like), preservatives, and food coloring agents.

The amount of saccharides (e.g., sugar) added to the rice flour bread dough of the present invention is not particularly limited, but such amount may be, for example, 0% to 30%, preferably 1% to 20%, and more preferably 3% to 7% by mass relative to the rice flour content. According to the present invention, bread making can be satisfactorily carried out with the addition of such relatively small amounts of saccharides, even when the amount of salt added is 0.4% or less, e.g., 0.35% or less, 0.25% or less, 0.15% or less, or 0.1% or less by mass relative to the rice flour as described below. When bread dough preparation of the present invention involves two steps of mixing, saccharides may be added to rice flour at first, or saccharides may be added to the dough together with yeast.

The rice flour bread dough of the present invention enables breads of good quality to be made even without the addition of wheat flour or wheat gluten, and it is thus adequate for patients with wheat allergies to ingest. Accordingly, it is preferred that the rice flour bread dough of the present invention do not contain cereal flour other than rice flour, in particular, wheat flour. It is also preferred that the rice flour bread dough do not contain gluten (wheat gluten, typically). In addition, it is preferred that the rice flour bread dough of the present invention contain only rice flour as a raw material cereal flour for the production of breads for patients with wheat allergies, for example.

Conventional rice flour bread dough contains gelatinized rice flour, gelatinized starch (e.g., tapioca flour, corn starch, kudzu starch, or potato starch), a polysaccharide thickener (e.g., guar gum, xanthan gum, locust bean gum, or pectin), or the like in order to improve the expandability. However, the rice flour bread dough of the present invention enables breads of good quality to be made without the addition of such additives. Accordingly, in one preferred embodiment, the rice flour bread dough according to the present invention is prepared without the addition of gelatinized rice flour, gelatinized starch, or a polysaccharide thickener.

It is preferred that the "rice flour bread dough" according to the present invention be free from salt (sodium chloride) (0 g), or contain only 0.4% by mass or less of salt (sodium chloride) (i.e., 0.4 g or less of salt relative to 100 g of rice flour), preferably 0.35% by mass or less, more preferably 0.25% by mass or less, further preferably 0.15% by mass or less, and particularly preferably 0.1% by mass or less of salt, relative to the content of rice flour. In conventional bread making, salt is considered to be effective in accelerating fermentation by bread yeast or increasing bread dough expansibility, in addition to being used for salting. Thus, approximately 1 to 2 g of salt per 100 g of rice flour is generally added even in the case of rice flour breads. The "rice flour bread dough" according to the present invention is capable of enhancing bread dough expansibility even if it contains no or a considerably reduced amount of salt. With the use of the "rice flour bread dough" according to the present invention having salt (sodium chloride) content of 0.4% or less, preferably 0.35% or less, more preferably 0.25% or less, further preferably 0.15% or less, and particularly preferably 0.1% or less relative to the rice flour content by mass, breads with significantly reduced salt content compared with conventional breads can be made.

The "rice flour bread dough" of the present invention can be prepared by combining rice flour, water, the dough improving agent comprising glutathione of the present invention, yeast, and optionally other sub materials and mixing by one or more steps. In the food processing industry, "mixing" refers to the mixing up of a mixture of powder, liquid, and optionally other raw materials so as to homogeneously disperse such ingredients. In the field of food processing industry, "mixing" is also referred to as "kneading." In the present invention, mixing can be carried out with the aid of a mixing apparatus or an agitation function of a bread maker or the like, or it can be carried out manually. The "rice flour bread dough" of the present invention may be prepared by combining rice flour, a liquid such as water, and other raw materials of dough, such as the dough improving agent comprising glutathione according to the present invention, yeast, and saccharides at once, and mixing them. Alternatively, the "rice flour bread dough" of the present invention may be prepared by a method comprising two or more mixing steps. For example, rice flour, a liquid such as water, and other raw materials such as the dough improving agent comprising glutathione according to the present invention may be combined and mixed, and then other raw materials of dough including yeast are combined and mixed therewith to prepare a rice flour bread dough of the present invention. Mixing may be carried out at a general temperature that is employed for mixing during bread making and generally carried out at approximately 15° C. to 32° C., and preferably 18° C. to 30° C., although the temperature is not particularly limited. Mixing may be carried out for a period of time for general mixing known to a person skilled in the art, for example, approximately 3 to 40 minutes per a single step of mixing, and preferably approximately 10 to 30 minutes per a single step of mixing.

When preparing the rice flour bread dough of the present invention, it is preferred that raw materials for dough comprising the dough improving agent of the present invention, rice flour, water, and the like be combined together and mixed, and then the resulting bread dough be allowed to stand for a certain period before yeast and optionally other raw materials, such as saccharides, are added thereto, so that sufficient time for soaking of rice flour would be secured. In such a case, after the dough improving agent of the present invention, rice flour, water, and the like are mixed, the resulting dough may be allowed to stand at approximately room temperature (15° C. to 30° C.) for 20 minutes or longer, generally for two nights at maximum, more preferably for 4 to 24 hours, and further preferably overnight (7 to 18 hours; e.g., 12 hours) before yeast and saccharides are added to the dough. Under such conditions, rice flour can be sufficiently soaked in water. A longer duration of soaking can lead to remarkably improved bread-making properties (e.g., bread expandability and texture fineness). After the elapse of the duration of soaking, yeast and optionally other raw materials such as saccharides (e.g., sugar) may be added to the dough, and the resultant may be mixed, and thus, a high-quality rice flour bread dough exhibiting more stable expandability can be prepared.

The bread dough prepared from raw materials containing rice flour, water, the dough improving agent comprising glutathione according to the present invention, yeast, and optionally other sub materials via mixing as described above can be fermented (raised) via any technique employed for bread making, following the addition of yeast. For example, such bread dough may be allowed to stand at a temperature suitable for fermentation (preferably 25° C. to 32° C.) for approximately 15 minutes to 4 hours, in general (approximately 20 minutes to 2 hours, more generally), to initiate fermentation. In the present invention, bread dough fermentation may be initiated during the step of mixing. In accordance with a general process of bread making, it is also preferred that once fermentation has advanced at a relatively low temperature to some extent (primary fermentation, which may also be referred to as a "floor time"), the dough is further fermented at 4° C. to 42° C. (more preferably 25° C. to 42° C.) for approximately 15 minutes to 40 hours in general (approximately 20 minutes to 2 hours, more generally) (final fermentation, referred to as "final proof") to complete the step of fermentation. Further, in the fermentation step, it is also preferred to divide the dough into portions of the same size after primary fermentation, ball up each divided dough portion, to allow the dough to rest during bench time while humidity and temperature are maintained to restore the extensibility, shape the dough into bread shapes (e.g., sticks or rolls) or introduce food materials such as cream into the dough, and to subject the resultant to final fermentation to complete the fermentation step. Also, the rice flour bread dough of the present invention may be shaped at the beginning or it may be introduced into a mold for bread making, followed by the initiation of the step of fermentation, thereby performing the step of fermentation without interruption until the completion of fermentation. In the present invention, the step of fermentation can be carried out via various other known techniques for bread fermentation, such as low-temperature fermentation via incubation in a refrigerator for two nights.

According to the present invention, raw materials including the dough improving agent comprising glutathione according to the present invention, rice flour, water, yeast, and optionally other sub materials are used in various known techniques for bread making to produce high-quality rice flour breads. For example, bread making techniques common in Japan, such as the straight dough method, the sponge dough method, the Poolish method, or the Shitogi method, can be employed. In the present invention, in accordance with the so-called sponge dough method, a sponge dough comprising the dough improving agent of the present invention, a portion of rice flour, yeast, and water prepared via kneading is first prepared, the first fermentation is carried out, and then additional raw materials including residual rice flour are added and the dough is further subjected to mixing, and the resultant is then subjected to final fermentation. In the present invention, alternatively, in accordance with the straight dough method, all raw materials including the dough improving agent of the present invention, rice flour, yeast, water, and other raw materials are subjected to mixing, and primary fermentation, division, bench time, shaping, and final fermentation are continuously carried out.

The term "rice flour bread dough" as referred to in the context of the present invention refers to dough before fermentation, dough after primary fermentation, or dough after final fermentation. Various common techniques for bread making, such as storage in the state of a frozen dough can be uneventfully applied to the rice flour bread dough of the present invention.

After the completion of the step of fermentation, the fermented dough is subjected to baking. Thus, the rice flour breads according to the present invention can be made. Dough can be baked in accordance with a conventional technique. Specifically, a step of baking may be carried out by heating a dough via any heating means, such as an oven, microwave oven, pot, or steamer (heating at 100° C. to 240° C., for example). The duration of baking is approximately 5 to 100 minutes, in general. A person skilled in the art can adequately adjust the baking temperature or duration. The thus-prepared rice flour breads may be topped with nuts, fruit, or cream, or prepared food, ham, or the like may be sandwiched therebetween to make sweet buns or deli breads. The thus-processed rice flour breads are within the scope of the rice flour breads of the present invention.

The thus-made rice flour breads according to the present invention are satisfactorily expanded, softly puffed up, and finely textured (with fine foam), and such rice flour breads exhibit good textures and flavor.

The present invention also provides a method for making rice flour breads as described above. In short, in the method of the present invention, high-quality rice flour breads can be made by adding water, the dough improving agent of the present invention (e.g., glutathione or a composition comprising the same), yeast, and optionally other raw materials such as sugar, to rice flour as the main material, mixing, and fermenting (raising) the resulting dough and baking. In the method for making rice flour breads of the present invention, a yeast extract containing glutathione is added as the dough improving agent of the present invention to raw materials including rice flour The present invention also provides a flour mix (generally also referred to as a "premixed flour") for making rice flour bread dough comprising the dough improving agent of the present invention and rice flour. Water and yeast may be added to such mix, so that the rice flour bread dough of the present invention can be easily prepared. The mixing ratio of glutathione in the dough improving agent of the present invention relative to rice flour in the flour mix is the same as that used for the rice flour bread dough of the present invention. The flour mix may further comprise other raw materials for bread dough, but it is preferred that such flour mix be free from wheat flour and gluten for the reason described above. In addition, it is preferred that the flour mix be free from salt (sodium chloride), or have the salt content of 0.4% or less (i.e., 0.4 g or less of salt per 100 g of rice flour), preferably 0.35% or less, more preferably 0.25% or less, further preferably 0.15% or less, and particularly preferably 0.1% or less by mass, relative to the rice flour content.

EXAMPLES

Hereafter, the present invention is described in greater detail with reference to the examples. However, the technical scope of the present invention is not limited by these examples.

Example 1

Production of Rice Flour Bread with Glutathione—1

As a rice flour, Riz Farine (manufactured by Gunma Seifun Flour Milling Co., Ltd.), which is made from nonglutinous rice as a raw material and commercially available as a wheat-flour- and wheat-gluten-free rice flour for confections was used.

Reduced glutathione (Sigma-Aldrich) was used as glutathione.

The rice flour (280 g) and 280 g of water were introduced into the bread pan of a bread maker SPM-KP1 (SANYO Electric Co., Ltd.), 0 to 5 g of glutathione was added thereto, and the mixture was subjected to mixing (kneading) via agitation at room temperature for 20 minutes via the program "bread dough mode". The resultant was allowed to stand overnight to soak the rice flour in water. Sugar (15 g) and 4 g of dry yeast for bread (Nisshin Foods Inc.) were added thereto on the following morning, the resultant was subjected to mixing (kneading) via the program "wheat-free/rice flour mode", and the bread dough was subjected to fermentation and baking to prepare rice flour breads. According to the program "wheat-free/rice flour mode", specifically, a step of mixing was carried out via agitation at room temperature for 20 minutes, a step of fermentation was carried out by raising the temperature to the fermentation temperature of 38° C. over a period of 10 minutes and incubating the dough (for 50 minutes, including the heating-up period), and a step of baking was then carried out by raising the temperature to 140° C. over a period of 15 minutes and incubating the dough for 35 minutes.

The bread height was measured on the day following baking. The measured bread height was expressed as a relative value to the height of the glutathione-free (0 g added) rice flour bread for control which was designated as 1, and the relative value was designated as the expansion rate. The bottom areas of the prepared breads were all the same of approximately 140 cm$^2$ (11×13 cm).

The obtained results are shown in Table 1 and FIG. 1.

TABLE 1

| Amount of reduced glutathione (GSH) added per 280 g of rice flour (Percentage of amount of GSH added relative to that of rice flour added) | Bread height (cm) | Expansion rate |
|---|---|---|
| 0 g (No glutathione added) | 5.0 | 1 |
| 0.25 g (about 0.09%) | 7.7 | 1.54 |
| 0.5 g (about 0.18%) | 8.9 | 1.78 |
| 0.75 g (about 0.27%) | 11.8 | 2.36 |
| 1.0 g (about 0.36%) | 11.5 | 2.30 |
| 2.0 g (about 0.71%) | 10.1 | 2.02 |
| 5.0 g (about 1.79%) | 7.5 | 1.50 |
| 10.0 g (about 3.57%) | 7.5 | 1.50 |

As shown in Table 1 and FIG. 1, the degree of expansion of the rice flour breads to which glutathione had been added was apparently greater than that for glutathione-free rice flour breads. The expansion rate increased as the amount of glutathione added increased. When glutathione was added in amounts of 0.5 to 2.0 g per 280 g of rice flour, the degree of expansion was 1.5 times or greater than that of glutathione-free rice flour breads.

Figure 2:
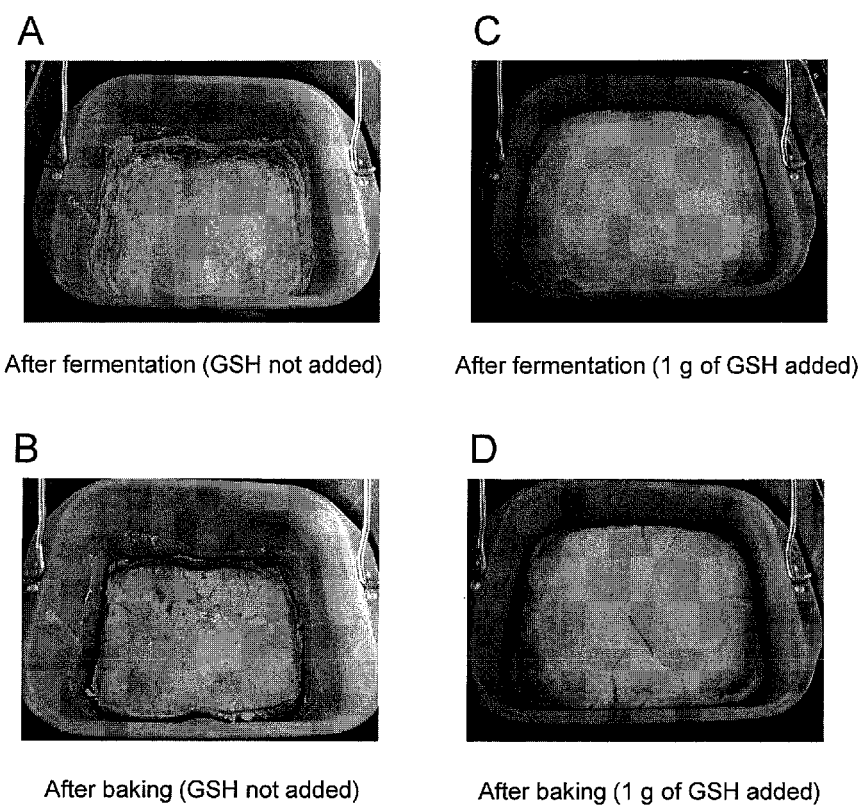
FIG. 2 is a photograph showing expansion of rice flour breads to which reduced glutathione (GSH) has been added in an cooker (a bread pan).

The results of observation of the dough and the rice flour breads demonstrated that the dough of glutathione-free rice flour breads was fragile and the texture was rough after baking, while in the case of rice flour breads to which glutathione had been added, the dough exhibited high flexibility, and the texture of the bread was fine after baking. FIG. 2 shows a photograph of dough at the time of fermentation (FIG. 2A) and a photograph of bread after baking the dough (FIG. 2B), when glutathione had not been added; and a photograph of dough at the time of fermentation (FIG. 2C) and a photograph of bread after baking the dough (FIG. 2D), when glutathione had been added.

Organoleptic test in 12 subjects was carried out. The subjects smelled glutathione-free rice flour breads and then rice flour breads to which glutathione had been added. The number of subjects who sensed an unusual odor, i.e., a distinctive sulfur odor was determined. While only 2 subjects sensed the unusual odor when 1 g of glutathione had been added, half or more of the subjects (7 subjects) sensed the unusual odor when 2 g of glutathione had been added. This indicates that the aroma of rice flour breads is somewhat influenced when 2 g or more glutathione is added.

As described above, the addition of glutathione leads to improvement in bread-making properties of rice flour. When dough containing 0.5 to 2.0 g of glutathione per 280 g of rice flour is used, in particular, further improved bread-making properties were observed. Further, breads had a better aroma, in addition to significantly improved expansion and texture fineness, when 0.5 to 1.0 g of glutathione is used per 280 g of rice flour.

Example 2

Production of Rice Flour Bread with Glutathione—2

Rice flour breads were prepared as described in Example 1, except that another commercially available wheat-flour- and wheat-gluten-free rice flour Namisato Super Fine Powder (Namisato Corporation) was used instead of Riz Farine. Also in this Example, rice flour breads to which glutathione had been added exhibited a satisfactory degree of expansion and texture fineness, as with Example 1.

Figure 3:
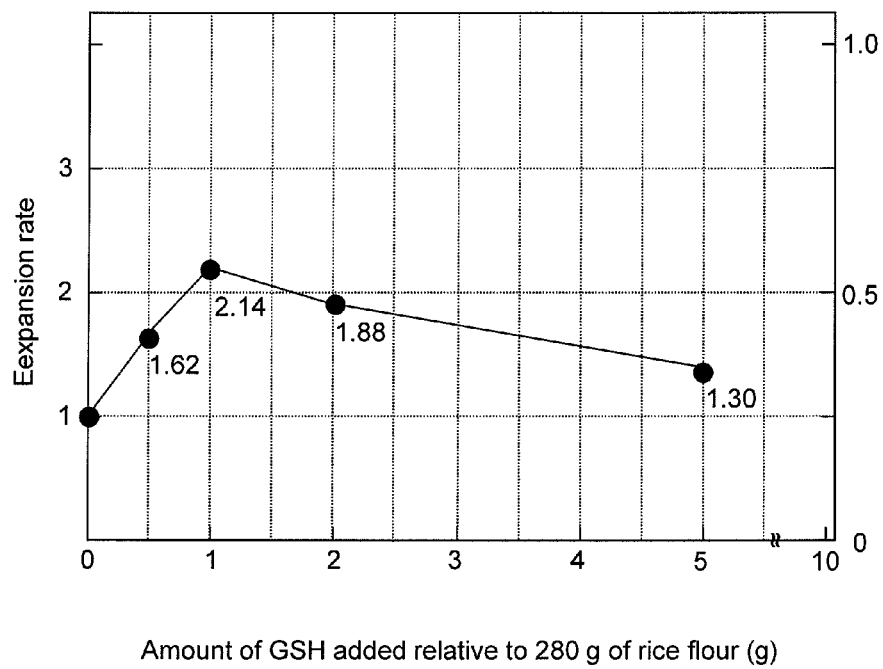
FIG. 3 shows expansion rates of rice flour breads to which different amounts of reduced glutathione (GSH) have been added, when bread making is carried out without allowing the dough to stand overnight.

Further, water and glutathione were added to rice flour (Namisato Super Fine Powder) as with Example 1, the resultant was subjected to fermentation and baking immediately after mixing without being allowed to stand overnight, to produce rice flour breads. Specifically, 280 g of water and 0 to 5 g of reduced glutathione were added to 280 g of rice flour (Namisato Super Fine Powder), the mixture was agitated at room temperature for 20 minutes via the program "bread dough mode" (the step of mixing), and immediately thereafter 15 g of sugar and 4 g of bread yeast were added and the dough was subjected to mixing, fermentation, and baking via the program "wheat-free/rice flour mode". The bread height was measured on the day following baking. The expansion rate of rice flour breads were determined relative to the standard to which no glutathione had been added, as described in Example 1. As a result, the expansion rates were 1.62, 2.14, 1.88, and 1.30 when 0.5 g, 1.0 g, 2.0 g, and 5.0 g of glutathione had been added per 280 g of rice flour (FIG. 3). Particularly good bread-making properties were observed when 0.5 to 2.0 g of glutathione had been added per 280 g of rice flour. When 1.0 g of glutathione was added per 280 g of rice flour, the resulting bread exhibited the most good degree of expansion, and the expansion rate exceeded 2.0. When the dough was subjected to fermentation immediately after mixing, some resulting breads exhibited a partial dent, although the degree of expansion was satisfactory. Thus, the bread of Example 1, in which the fermentation was carried out after allowing to stand overnight, was better in terms of uniformity of expansion.

Further, water and reduced glutathione were added to rice flour, and, immediately thereafter, the resultant was subjected to mixing, fermentation, and baking steps via the program "wheat-free/rice flour mode" without agitation and allowing to stand overnight via the program "bread dough mode". Also in this case, the results substantially the same as those above obtained when the step of allowing to stand overnight was omitted were obtained.

Example 3

Production of Rice Flour Bread with Glutathione—3

Glutathione is classified as reduced or oxidized glutathione, and the former is generally used; however, oxidized glutathione has also drawn attention in recent years because of its high degree of stability. Thus, whether or not reduced glutathione and oxidized glutathione have different effects of improving bread-making properties of rice flour was investigated.

Namisato Super Fine Powder, which was also used in Example 2, was used as rice flour. Oxidized glutathione manufactured by Sigma-Aldrich was used. Reduced glutathione, dry yeast for bread, a bread pan, and the bread maker used in Example 1 were also used in Example 2.

Water (140 g) was added to 140 g of rice flour, reduced or oxidized glutathione was added in the amount described below, the mixture was agitated at room temperature for 20 minutes via the program "bread dough mode" of the bread maker, and the resultant was then allowed to stand overnight at room temperature. After 7.5 g of sugar and 2 g of dry yeast for bread were added, the mixture was subjected to mixing via the program "wheat-free/rice flour mode", and the bread dough was subjected to fermentation and baking to produce rice flour breads. The steps of mixing, fermentation, and baking were carried out in the same manner as in Example 1.

The bread height was measured on the day following baking, and the expansion rates of rice flour breads were determined in the same manner as in Example 1.

Figure 4:
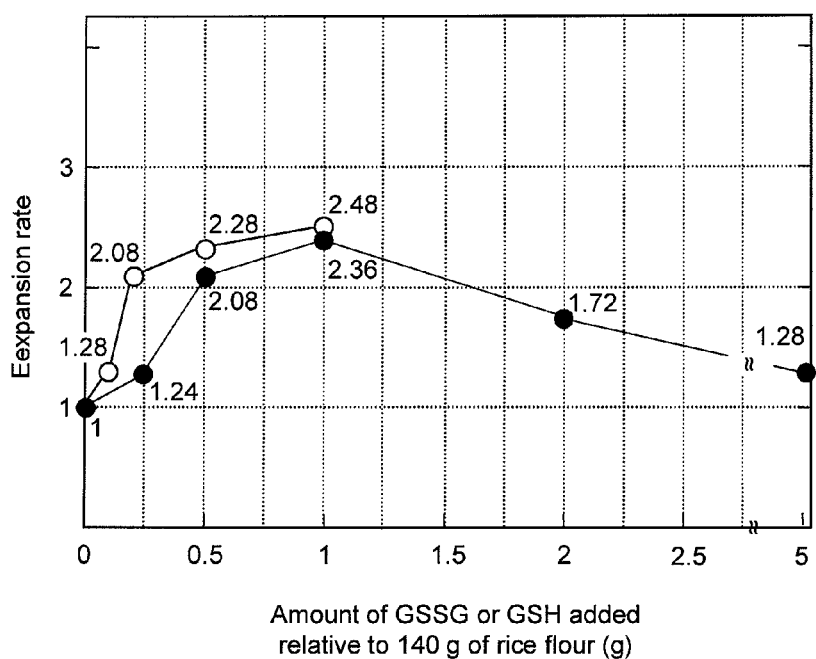
FIG. 4 shows expansion rates of rice flour breads to which different amounts of oxidized glutathione (GSSG) or reduced glutathione (GSH) have been added.

The obtained results are shown in Table 2 and FIG. 4.

TABLE 2

| Amount of GSSG or GSH added per 140 g of rice flour (Percentage of amount of glutathione added relative to that of rice flour added) | Bread height (cm) | Expansion rate |
| --- | --- | --- |
| 0 g (No glutathione added) | 2.5 | 1 |
| Oxidized glutathione | | |
| 0.25 g (about 0.18%) | 3.1 | 1.24 |
| 0.5 g (about 0.36%) | 5.2 | 2.08 |
| 1.0 g (about 0.71%) | 5.9 | 2.36 |
| 2.0 g (about 1.43%) | 4.3 | 1.72 |
| 5.0 g (about 3.57%) | 3.2 | 1.28 |
| Reduced glutathione | | |
| 1.0 g (about 0.07%) | 3.2 | 1.28 |
| 0.2 g (about 0.14%) | 5.2 | 2.08 |
| 0.5 g (about 0.36%) | 5.7 | 2.28 |
| 1.0 g (about 0.71%) | 6.2 | 2.48 |

In FIG. 4, a filled circle represents rice flour bread to which oxidized glutathione had been added, and an open circle represents rice flour bread to which reduced glutathione had been added.

As shown in Table 2 and FIG. 4, the degree of expansion of the rice flour breads to which oxidized or reduced glutathione had been added was apparently greater than that of glutathione-free rice flour breads. The expansion rate increased as the amount of glutathione added increased. When glutathione was added in amounts of 0.5 g to 2.0 g per 140 g of rice flour, the degree of expansion was 1.5 times or more greater than that of glutathione-free rice flour breads in such range. When glutathione was added in amounts of 0.5 g to 1.0 g, the degree of expansion was 2.0 times or more greater in such range.

The effect of reduced glutathione to improve bread-making properties for rice flour was somewhat greater than that of oxidized glutathione. When a lower amount of oxidized glutathione (0.2 to 0.5 g) was added, the effect to improve bread-making properties were relatively weak, while such lower amount of reduced glutathione exhibited a higher effect to improve bread-making properties.

Organoleptic test in 8 subjects was carried out. The subjects smelled glutathione-free rice flour breads and then rice flour breads to which oxidized glutathione had been added. The number of subjects who sensed an unusual odor, a distinctive sulfur odor, was determined. While only 1 subject sensed the unusual odor when 1 g of oxidized glutathione had been added, almost half of the subjects (3 subjects) sensed the unusual odor when 2 g of oxidized glutathione had been added. This indicates that the aroma of rice flour breads is somewhat influenced when 2 g or more of oxidized glutathione is added, but the unusual odor is weaker than that attained with the addition of reduced glutathione. The breads had a better aroma, in addition to significantly improved expansion and texture fineness, when 0.5 to 1.0 g of oxidized glutathione is added per 140 g of rice flour.

The above results demonstrate that in addition to reduced glutathione, oxidized glutathione also has the effect of improving bread-making properties of rice flour.

Example 4

Production of Rice Flour Bread with Mixed Glutathione

Rice flour breads were prepared using mixtures of reduced glutathione (GSH) and oxidized glutathione (GSSG) at various different mixing ratios.

Namisato Super Fine Powder, which was also used in Example 2, was used as rice flour. Reduced glutathione, dry yeast for bread, a bread pan, and the bread maker used in Example 1, as well as oxidized glutathione used in Example 2, were used.

Water (280 g) and reduced glutathione and/or oxidized glutathione at different mixing ratios (0.9 g in total) were added to 280 g of rice flour, the mixture was agitated at room temperature for 20 minutes via the program "bread dough mode", and the resultant was allowed to stand overnight at room temperature. Subsequently, 15 g of sugar and 4 g of dry yeast for bread (Nisshin Foods Inc.) were added thereto, the mixture was subjected to mixing (kneading) via the program "wheat-free/rice flour mode", and the bread dough was subjected to fermentation and baking to prepare rice flour breads. The steps of mixing, fermentation, and baking were carried out in the same manner as in Example 1.

The bread height was measured on the day following baking, and the expansion rates of rice flour breads were determined in the same manner as in Example 1.

Figure 5:
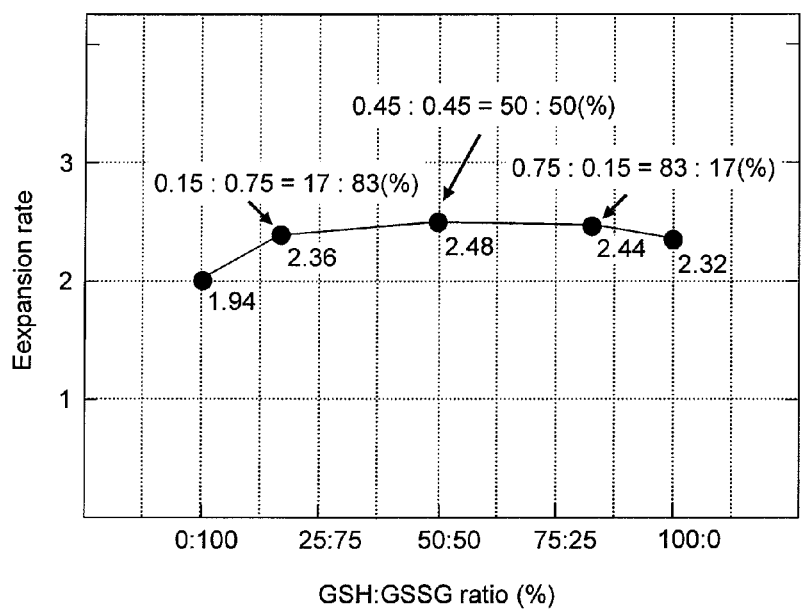
FIG. 5 shows expansion rates of rice flour breads to which oxidized glutathione (GSSG) and reduced glutathione (GSH) have been added at different mixing ratios.

The obtained results are shown in Table 3 and FIG. 5.

TABLE 3

| GSH:GSSG mixing ratio | Amount of GSH added | Amount of GSSG added | Expansion rate |
| --- | --- | --- | --- |
| No glutathione added (control) | 0 g | 0 g | 1 |
| 0%:100% | 0 g | 0.9 g | 1.94 |
| 17%:83% | 0.15 g | 0.75 g | 2.36 |
| 50%:50% | 0.45 g | 0.45 g | 2.48 |
| 83%:17% | 0.75 g | 0.15 g | 2.44 |
| 100%:0% | 0.9 g | 0 g | 2.32 |

Figure 6:
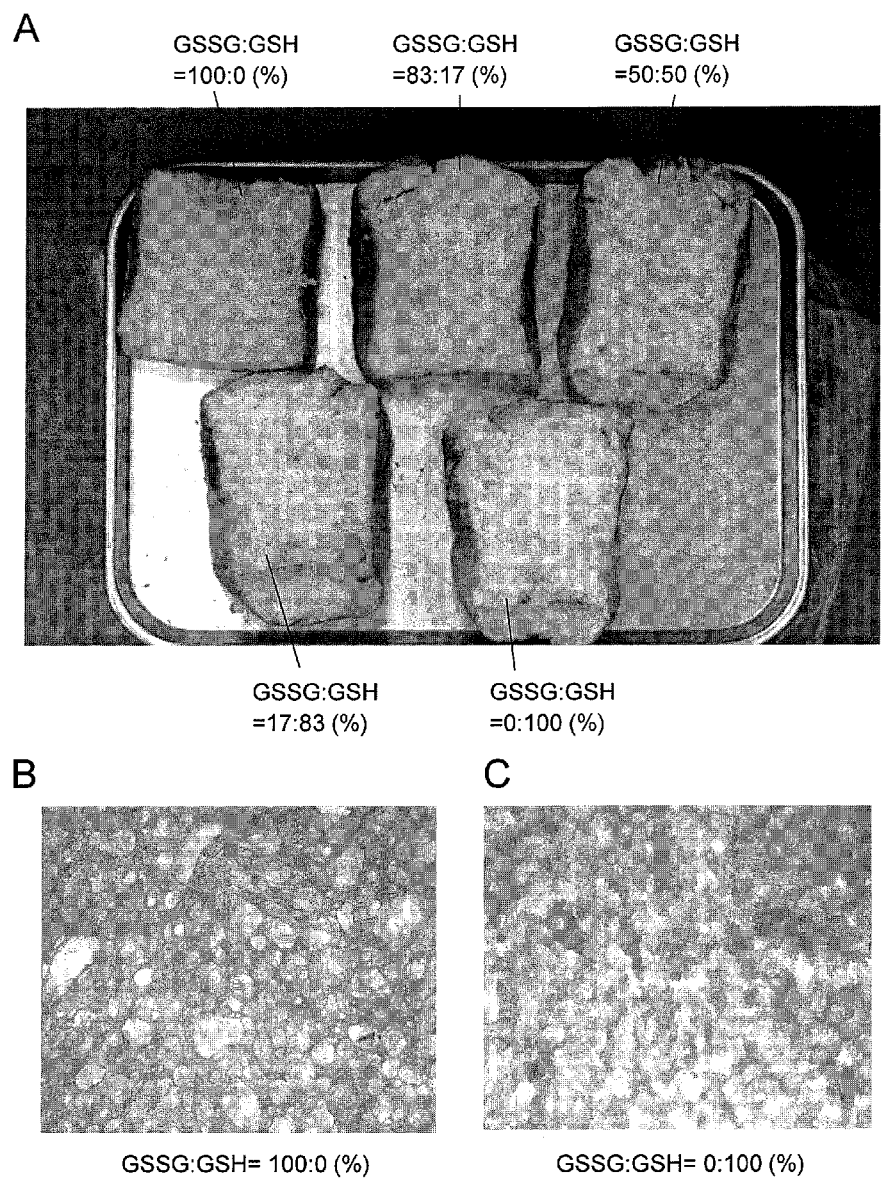
FIG. 6 is a photograph showing cross sections of rice flour breads to which oxidized glutathione (GSSG) and reduced glutathione (GSH) have been added at different mixing ratios.

As shown in Table 3 and FIG. 5, all of rice flour breads to which oxidized glutathione and reduced glutathione had been added at different mixing ratios exhibited degrees of expansion that were apparently greater than those of glutathione-free rice flour breads (FIG. 6A). The expansion rate was greater when reduced glutathione was included, compared with cases in which only oxidized glutathione had been added.

The rice flour breads after baking were observed. As a result, bread containing a larger amount of oxidized glutathione was found to have a tendency to be harder and have a roughened texture. The rice flour bread made with the use of oxidized glutathione only was found to exhibit a French-bread-like texture with a rough foam layer (FIG. 6B). The rice flour bread made with the use of reduced glutathione only was found to exhibit a soft, cotton-candy-like texture with a fine foam layer (FIG. 6C). However, a sufficient degree of expansion was observed in both bread samples (FIG. 6A).

Example 5

Influence of Salt Content on Bread-Making Properties in Rice Flour Bread to which Glutathione Had been Added The influence of the amount of salt that is generally added to the bread dough on bread-making properties of rice flour bread dough to which glutathione had been added was examined. Rice flour, reduced glutathione, dry yeast for bread, a bread pan, and the bread maker used in Example 1 were used herein.

Water (140 g) was added to 140 g of rice flour, 0 to 10 g of salt and 0.5 g of reduced glutathione were further added, the mixture was agitated at room temperature for 20 minutes via the program "bread dough mode" of the bread maker, and the resultant was allowed to stand overnight at room temperature. After 7.5 g of sugar and 2 g of dry yeast for bread were added on the following day, the mixture was subjected to mixing via the program "wheat-free/rice flour mode", and the bread dough was subjected to fermentation and baking to prepare rice flour breads. The steps of mixing, fermentation, and baking were carried out in the same manner as in Example 1.

The bread height was measured on the day following baking. The height of rice flour bread (control), which was glutathione-free (0 g added) and salt-free (0 g added), prepared in the same manner, was designated as 1, the measured bread height was expressed as a relative value thereto, and the relative value was designated as the expansion rate.

Figure 7:
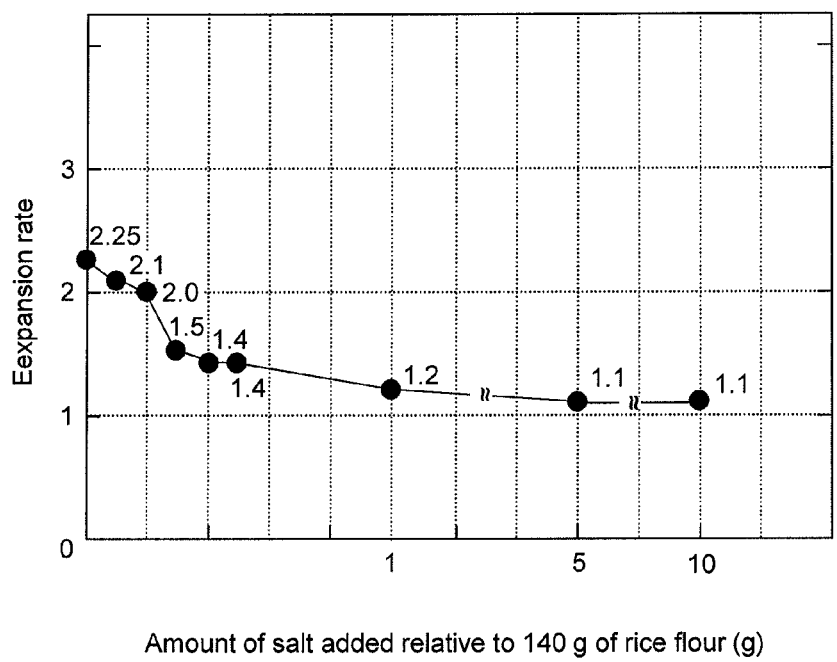
FIG. 7 shows the influence of different amounts of salts added on expansion rates of rice flour breads to which glutathione has been added.

The obtained results are shown in Table 4 and FIG. 7.

TABLE 4

| Amount of salt added per 140 g of rice flour (Value within parentheses: added amount relative to 100 g of rice flour) | Expansion rate |
| --- | --- |
| No glutathione and salt added | 1 |
| 0 g (no salt added) | 2.25 |
| 0.1 g (about 0.07 g) | 2.1 |
| 0.2 g (about 0.14 g) | 2.0 |
| 0.3 g (about 0.21 g) | 1.5 |
| 0.4 g (about 0.29 g) | 1.4 |
| 0.5 g (about 0.36 g) | 1.4 |
| 1.0 g (about 0.71 g) | 1.2 |
| 5.0 g (about 3.57 g) | 1.1 |
| 10 g (about 7.14 g) | 1.1 |

When the rice flour breads of the present invention were prepared with the addition of salt in an amount exceeding 1.0 g per 140 g of rice flour, the expansion rate was significantly lowered, and bread-making properties were significantly deteriorated compared with those of breads prepared without the addition of salt (but with the addition of glutathione), as shown in Table 4 and FIG. 7. When 0.5 g or less salt was added per 140 g of rice flour, in particular, the expansion rate was relatively satisfactory. When 0.2 g or less salt was added per 140 g of rice flour, the expansion rate was remarkably increased to 2.0 or greater, and bread-making properties of the dough were remarkably improved.

An experiment aimed at examination of influences of different amounts of salt added was conducted under the conditions described above, except that oxidized glutathione was used instead of reduced glutathione. The results were similar to those attained with the use of reduced glutathione. When more than 1.0 g of salt was added, specifically, the expansion rate was as low as that of rice flour breads to which no glutathione and salt was added. As the amount of salt added was reduced, however, the expansion rate was significantly elevated, and bread-making properties were significantly improved. When 0.2 g or less salt was added per 140 g of rice flour (0 g, 0.1 g, or 0.2 g), in particular, the expansion rate was 1.6 or greater (2.1, 2.0, or 1.6, respectively). This indicates that bread-making properties of the dough were significantly improved.

The results indicate that the amount of salt added to the bread dough may be reduced when preparing the rice flour bread with the addition of glutathione, so that satisfactory bread-making properties can be attained.

Example 6

Influence of Mixing Ratio of Rice Flour to Water on Bread-Making Properties

Water was added to 100 to 180 g of rice flour (100 g, 120 g, 130 g, 140 g, 150 g, 160 g, 170 g, or 180 g) to bring the total amount of the mixture to 280 g, 0.5 g of reduced glutathione was added thereto, the mixture was agitated via the program "bread dough mode", and the resultant was allowed to stand overnight at room temperature. After 7.5 g of sugar and 2 g of dry yeast for bread were added on the following day, the mixture was subjected to mixing via the program "wheat-free/rice flour mode" to prepare bread dough. Subsequently, the bread dough was subjected to fermentation and baking via the same program used to prepare rice flour breads. The steps of mixing, fermentation, and baking were carried out in the same manner as in Example 1. Reduced glutathione, dry yeast for bread, a bread pan, and the bread maker used in Example 1 were used herein.

Figure 8:
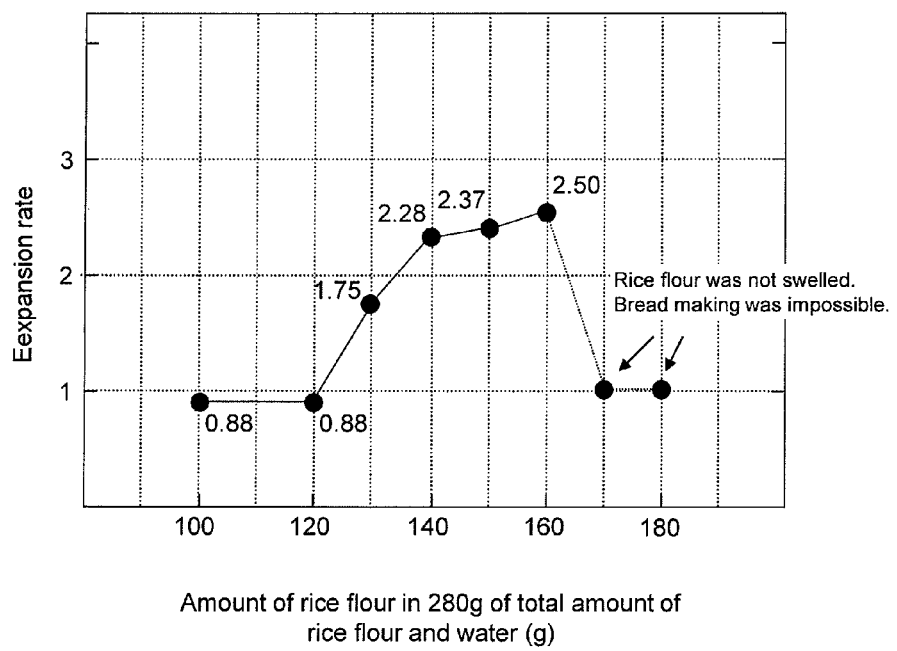
FIG. 8 shows expansion rates of rice flour breads when rice flour and water have been added at different mixing ratios.

The results are shown in FIG. 8. Bread was not formed when 180 g to 160 g of water was added per 100 g to 120 g of rice flour. As the amount of rice flour increased to a level exceeding 120 g (amount of water: 160 g), bread-making effects were improved. Rice flour breads prepared with the use of dough comprising 150 g to 120 g of water per 130 g to 160 g of rice flour were found to satisfactorily expand. When the amount of rice flour was increased to a level exceeding 160 g (amount of water: 120 g), rice flour could not expand, and dough could not be prepared.

Example 7

Influence of Soaking Duration Before Fermentation Step

A bread making test was carried out in the same manner as in Example 1, except that the amount of reduced glutathione (GSH) added to 280 g of rice flour and 280 g of water was 0 g, 0.1 g, 0.2 g, or 0.5 g, and the resultants were agitated at room temperature for 20 minutes and then allowed to stand overnight (12 hours) or for two nights (36 hours) (two types of soaking duration of rice flour).

Figure 9:
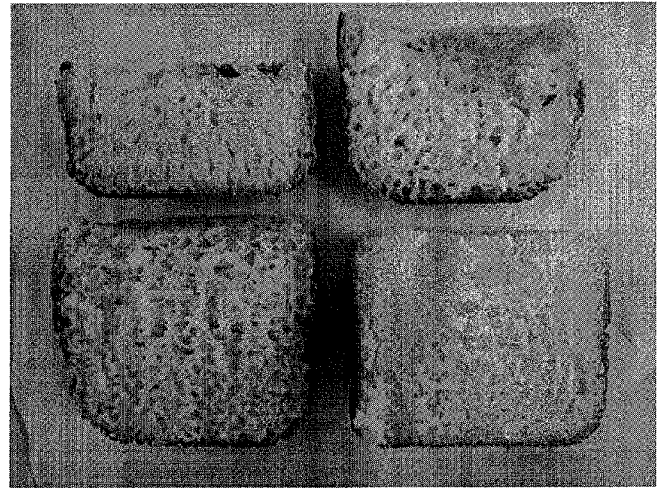
FIG. 9 shows an influence of different soaking durations after glutathione and water had been added to rice flour.
Figure 9:
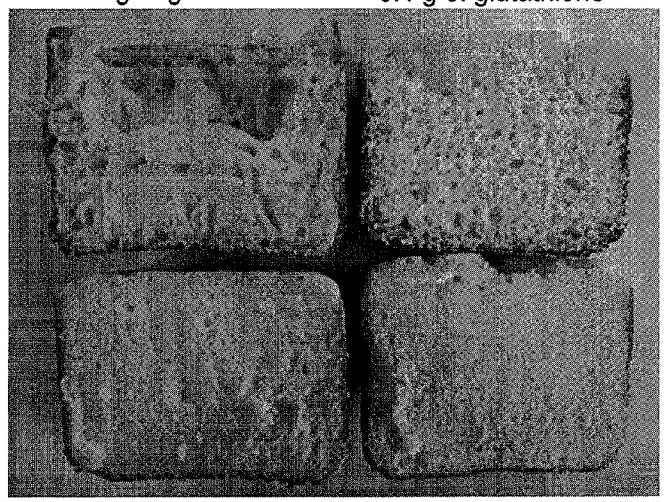

FIG. 9 shows a photograph of bread immediately after baking. When the soaking duration is two nights, the resulting bread expanded more and exhibited better texture fineness in all the cases the amount of reduced glutathione (GSH) added was 0.1 g, 0.2 g, or 0.5 g. In contrast, when no reduced glutathione (GSH) was added, some improvement was observed in the degree of expansion of the breads by soaking for two nights, a large dent was observed on the top of the bread, and no significant improvement was observed in bread-making properties. This indicates that bread-making properties can further be improved by changing the duration for which the rice flour with glutathione is soaked after the addition of water from overnight to two nights.

INDUSTRIAL APPLICABILITY

According to the method of making breads of the present invention, wheat flour used for breads can be substituted with rice flour to prepare high-quality breads. This can contribute to expansion of rice flour consumption and will be good news for patients with wheat allergies. Since the necessity of adding salt is eliminated, the present invention is applicable to low-salt breads for patients with renal diseases.

All publications, patents, and patent applications cited herein are incorporated herein by reference in their entirety.

What is claimed is:

1. A gluten-free mixed bread dough comprising rice flour, yeast, water and a dough improving agent for gluten-free rice flour breads, wherein said agent comprises glutathione, wherein gluten is excluded from the dough, and wherein the content of the glutathione from the dough improving agent is 0.05% or more by mass of the rice flour content.

2. The gluten-free mixed bread dough according to claim 1, wherein the bread dough does not contain wheat flour.

3. The gluten-free mixed bread dough according to claim 1, wherein the bread dough further comprises salt, wherein the salt content is no more than 0.4% by mass of the rice flour content.

4. A method for making a gluten-free rice flour bread comprising the steps of:
   (a) mixing a bread dough comprising rice flour, yeast, water and a dough improving agent for gluten-free rice flour breads, wherein said agent comprises glutathione, wherein gluten is excluded from the dough, and wherein the content of the glutathione from the dough improving agent is 0.05% or more by mass of the rice flour content;
   (b) fermenting the bread dough; and
   (c) baking the fermented dough.

5. A gluten-free rice flour bread made by the method according to claim 4.

6. A gluten-free flour mix for making gluten-free rice flour bread dough, wherein said mix comprises a dough improving agent for gluten-free rice flour breads and rice flour, wherein said agent comprises glutathione, wherein gluten is excluded from the flour mix, and wherein the content of the glutathione from the dough improving agent is 0.05% or more by mass of the rice flour content.

7. The gluten-free flour mix according to claim 6, wherein the flour mix does not contain wheat flour.

8. The gluten-free flour mix according to claim 6, wherein the flour mix further comprises salt, wherein the salt content is no more than 0.4% by mass of the rice flour content.

9. The gluten-free mixed bread dough according to claim 1, wherein the content of the glutathione from the dough improving agent is 0.05% to 5.0% by mass of the rice flour content.

10. The method according to claim 4, wherein the bread dough does not contain wheat flour.

11. The method according to claim 4, wherein the bread dough further comprises salt, wherein the salt content is no more than 0.4% by mass of the rice flour content.

12. The method according to claim 4, wherein the bread dough comprises the content of the glutathione from the dough improving agent being 0.05% to 5.0% by mass of the rice flour content.

13. The gluten-free flour mix according to claim 6, wherein the content of the glutathione from the dough improving agent is 0.05% to 5.0% by mass of the rice flour content.

14. The gluten-free mixed bread dough according to claim 1, wherein the bread dough does not contain salt.

15. The gluten-free flour mix according to claim 6, wherein the flour mix does not contain salt.

16. The method according to claim 4, wherein the bread dough does not contain salt.

* * * * *